(12) United States Patent
Gente et al.

(10) Patent No.: US 9,193,000 B2
(45) Date of Patent: Nov. 24, 2015

(54) METALLIC COMPONENT FOR HIGH-PRESSURE APPLICATIONS

(75) Inventors: Arnold Gente, Stuttgart (DE); Chris Burger, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 13/807,454

(22) PCT Filed: May 24, 2011

(86) PCT No.: PCT/EP2011/058403
§ 371 (c)(1),
(2), (4) Date: Feb. 12, 2013

(87) PCT Pub. No.: WO2012/000720
PCT Pub. Date: Jan. 5, 2012

(65) Prior Publication Data
US 2013/0134052 A1 May 30, 2013

(30) Foreign Application Priority Data
Jun. 28, 2010 (DE) .......... 10 2010 030 586

(51) Int. Cl.
*B23H 9/10* (2006.01)
*B23H 9/00* (2006.01)
*B23H 5/06* (2006.01)
*B23H 3/00* (2006.01)
*F02M 59/44* (2006.01)

(52) U.S. Cl.
CPC .. *B23H 5/06* (2013.01); *B23H 3/00* (2013.01); *B23H 9/00* (2013.01); *B23H 9/10* (2013.01); *F02M 59/445* (2013.01); *F02M 2200/02* (2013.01)

(58) Field of Classification Search
CPC .............. B23H 5/06; B23H 9/00; B23H 9/10; B23H 9/14; B23H 9/16
USPC ......................................................... 205/661
See application file for complete search history.

(56) References Cited

U.S. PATENT DOCUMENTS

| 5,351,398 A * | 10/1994 | Haxell ..................... 29/890.142 |
| 5,819,808 A | 10/1998 | Smith |
| 2008/0069712 A1 | 3/2008 | Mennicken et al. |
| 2008/0302281 A1* | 12/2008 | Bernard et al. ............... 110/192 |
| 2009/0120411 A1 | 5/2009 | Arnold et al. |

FOREIGN PATENT DOCUMENTS

| CN | 101444861 | 6/2009 |
| CN | 101450407 | 6/2009 |
| JP | H0724709 | 1/1995 |
| JP | 4274026 | 6/2009 |
| WO | 95/12478 | 5/1995 |
| WO | WO 2009045147 A1 * | 4/2009 |

OTHER PUBLICATIONS

PCT/EP2011/058403 International Search Report dated Sep. 15, 2011 (Translation and Original, 4 pages).

* cited by examiner

*Primary Examiner* — Nicholas A Smith
(74) *Attorney, Agent, or Firm* — Michael Best & Friedrich LLP

(57) ABSTRACT

A metallic component (1) for high-pressure applications, which serves in particular for fuel injection systems of air-compressing, self-igniting internal combustion engines, comprises at least one transition region (2). The transition region (2) is re-worked here after a hardening operation. The re-working is performed by electrochemical removal and mechanical removal, in particular honing.

17 Claims, 2 Drawing Sheets

METALLIC COMPONENT FOR HIGH-PRESSURE APPLICATIONS

BACKGROUND OF THE INVENTION

The invention relates to a metallic component for high-pressure applications, in particular for fuel injection systems of air-compressing, self-igniting internal combustion engines.

A high-pressure pump for a fuel injection device of an internal combustion engine is known from the German patent publication DE 10 2004 028 999 A1. The known high-pressure pump comprises a pump element, which has a pump piston that is guided such that it can be moved in a reciprocating manner in a cylinder bore of a pump housing part. The pump piston delimits thereby a pump working chamber in the cylinder bore. The pump working chamber can be filled with fuel via a suction valve during the intake stroke. The pump working chamber additionally has a connection to an outlet via a fuel drainage channel running inside the pump housing, said outlet being connected, for example, to a high-pressure accumulator. An exhaust valve which opens out of the pump working chamber is disposed at the outlet of the fuel drainage canal into said pump working chamber.

The high-pressure pump known from the German patent publication DE 10 2004 028 999 A1 has the disadvantage that the high pressure consistency of the high pressure pump particularly in the region of the outlet of the fuel drainage canal into the pump working chamber is limited at this location. As a result, a range for the admissible internal pressure and thus also the maximum delivery pressure are limited.

SUMMARY OF THE INVENTION

The inventive metallic component has the advantage that the high pressure consistency is improved. Said high pressure consistency can particularly be improved at geometrically unfavorable locations, and therefore local stress peaks are limited in the component. In so doing, the range for the admissible internal pressure can be enlarged, whereby durability is improved and/or the maximally achievable delivery pressure is increased.

By means of electrochemical removal (ECM), the high pressure consistency can be increased in the hardened state. Electrochemical removal is a material removing manufacturing process, with which even complicated spatial shapes can be developed. Electrochemical removal can be carried out with a precision in the micrometer range. During electrochemical removal, no contact is required between the tool and the workpiece, i.e. the metallic component. Because no mechanical forces are transferred, material features such as hardness, toughness and the like are of secondary importance for carrying out the process. For example, the workpiece can be polarized as the anode and the tool as the cathode, wherein the shape of the tool cathode specifies the shape of the workpiece. A working gap is set between tool and workpiece. An electrolyte solution takes on the charge transport in the charge gap.

By reworking the transition region, a limitation of the resulting local mechanical stress peaks can be achieved in an advantageous manner. This can, for example, be achieved by rounding off edges and/or by introducing contours having uniform transitions. The configuration of a rounded-off edge or of such a contour results from electrochemical removal.

The implementation of electrochemical removal after hardening has several advantages. The material structure is generally more fine-grained after heat treatment, and therefore improved surface qualities are achieved than those prior to the heat treatment. The good surface qualities achieved during electrochemical removal in the annealed state are again worsened by a grain reorientation during the heat treatment, which is therefore prevented from the outset. In addition, impacts of the heat treatment on the surface of the regions processed by electrochemical removal are prevented, for example a surface oxidation when tempering in a salt bath. Furthermore, a surface oxidation layer on highly stressed regions, which can flake off due to constant pulsating stress resulting from internal pressure, is prevented.

Electrochemical removal in the hardened state creates however problems which can be solved in an advantageous manner. One problem is that in the case of case pre-hardened steels, the case hardened surface layer is once again removed so that a zone is no longer present in the region of the electrochemical removal. A further problem is that in the case of through-hardened materials, such as, for example, 100Cr6, having a bainitic heat treatment, a declined surface quality exists through the surface oxidation layer as a result of the heat treatment in the edge regions of the succeeding processing operation by means of electrochemical removal. This effect explains why the surface oxidation layer is so poorly conductive. In edge regions of the processing operation by means of electrochemical removal, the current density for the electrochemical removal is so low that said density dissolves the surface oxidation layer only at local weak points. The process of electrochemical removal acts more strongly at said weak points than at points having a more adhering layer. As a result, steep-coast shaped structures can, for example, form on the outlet of the processing region for the electrochemical removal, which have a poor surface quality. It has been shown that this transition region having a poor surface quality represents a probable breaking point of the cylinder head during a high-pressure pulse test. When a break in the cylinder head related to the aforementioned condition occurs, it has been shown that the break as a rule started where the rough transitional area passes into the region of surface oxidation of the heat treatment. In contrast thereto, the start of the break in pulse tests having a processing operation by means of electrochemical removal in the annealed state usually occurs in the core region of the electrochemical removal, which is also the most critical region from the standpoint of stress technology.

Based on the results of the examination performed, which indicate that in the case of the pulse test having electrochemical removal in the hard condition, the cause for the broken components is attributed to the transition zone into the region of uninfluenced surface oxidation; and no break occurs in the core region of the electrochemical removal. Consequently the increase in the high pressure consistency by means of electrochemical removal in the hardened state in the core region of the electrochemical removal is proven. Likewise the importance of the transitional area between the electrochemical removal, which is carried out in the hardened state, and the uninfluenced surface oxidation in the adjacent bore is proven. In order however to increase the high pressure consistency of the entire component, the high pressure consistency of said transition region has to be optimized. In this connection, the high pressure consistency of components for the diesel injection technology can be particularly increased.

The increase in the high pressure consistency results from the combination of the electrochemical removal in the hardened state (ECM hard) with the removal of the surface oxidation and smoothing of the transition region preferably by means of honing process of the bore or bores adjoining the ECM region. This relates preferably to a component which is subject to high pressure, is made from a through-hardened material and has an oxidation layer on the surface, wherein the through-hardening preferably occurs bainitically in a salt bath.

In one embodiment having a honed bore or the like, the honing process can remove the surface oxidation in an advantageous way prior to the electrochemical removal in the hardened state in order not to allow a transition zone to develop. It is also possible that the honing process is carried out subsequently to the process of electrochemical removal in the hardened state in order to again smoothly hone the transition region.

The transition zone between the region of the electrochemical removal and the surface oxidation layer can thus be optimized by the electrochemical removal in the hardened state in combination with a honing process. As a result, a considerable increase in compressive strength and therefore a design tailored to considerably higher pressures can be achieved. A load capacity relating to admissible internal pressures of more than 220 MPa (2200 bar) can particularly be achieved.

A mechanical removal can thus be advantageously carried out in the transition region prior to the electrochemical removal, wherein the mechanical removal is executed such that a surface layer formed by the hardening is removed at least partially at least in certain regions. Preferably as an alternative, a mechanical removal can also if need be or else additionally be carried out in an advantageous manner in the transition region after the electrochemical removal, wherein a roughness formed as a result of the electrochemical removal is reduced at least in certain areas. The mechanical removal can remove the surface oxidation prior to the electrochemical removal in order to not let a transition region arise or subsequently to the electrochemical removal in order to again smooth out the transition region.

It is also advantageous that the transition region is rounded by means of the electrochemical removal, that at least one transitional area is provided on the edge of the transition region and that the mechanical removal at least substantially takes place in the transitional area. The high pressure consistency in the transitional area to the uninfluenced surface oxidation can therefore be improved. In addition, the occurrence of stress peaks is limited as a result of rounding the transition region. Hence, altogether a high load capacity of the rounded transition region including the edges thereof results.

An at least partially trumpet shaped transition region is configured by means of the electrochemical removal. In so doing, a fillet between a bore having a large diameter and a bore having a small diameter is preferably configured by means of electrochemical removal, wherein an advantageous reduction of mechanical stress peaks can be achieved.

BRIEF DESCRIPTION OF THE DRAWINGS

Preferred exemplary embodiments of the invention are explained in detail in the following description with the aid of the accompanying drawings, in which corresponding elements are provided with analogous reference numerals. In the drawings.

DETAILED DESCRIPTION

Figure 1:
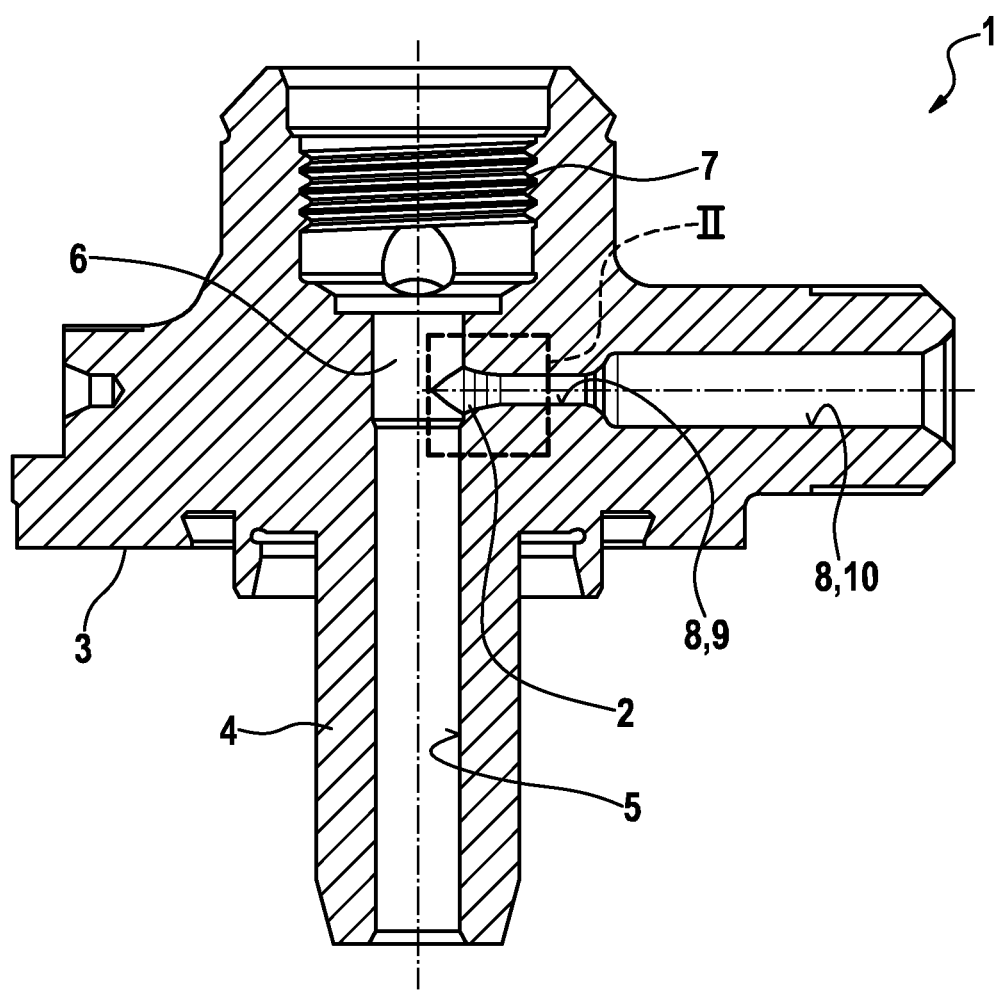
FIG. 1 shows a metallic component in a schematic, axial cross-sectional view according to one exemplary embodiment of the invention

FIG. 1 shows a metallic component 1 in a schematic, axial cross-sectional view according to one exemplary embodiment of the invention. The metallic component 1 is designed as a cylinder head for a high-pressure pump in said exemplary embodiment. The metallic component 1 has a transition region 2. The design of the transition region 2 can however also be implemented in a corresponding manner in other metallic components, which particularly are designed as a fuel distributor rail or as a component for an injector. Such a metallic component is particularly suitable for fuel injection systems of air compressing, self-igniting internal combustion engines. This is the case because operational demands resulting from high interior pressures occur in components associated with such systems. The metallic component 1 according to the invention is however also suited for other applications.

The metallic component 1 of the exemplary embodiment has a side 3. In the region of side 3, the metallic component 1 has an attachment piece 4. The metallic component 1 designed as a cylinder head 1 can be mounted on a high-pressure pump, wherein the side 3 rests on an outer side of the high-pressure pump. The attachment piece 4 then extends in a bore of a pump housing of the high-pressure pump. The cylinder head 1 has a bore 5 which extends through the attachment piece 4. A piece 6 of the bore 5 there serves as a pump working chamber 6. A pump piston, which is driven in a suitable manner by a cam of a drive shaft, is disposed in the bore 5 in the assembled state.

The cylinder head 1 has furthermore an internal screw thread 7, in which an intake valve, a metering unit or the like can be screwed. During operation, fuel can be guided into the pump working chamber 6 via such an intake valve. In addition, the cylinder head 1 has a stepped bore 8 having a section 9 and a section 10 with a large diameter. An exhaust valve can, for example, be inserted into the section 10. The section 9 opens out into the stepped bore 8. The outlet region is in this case given by the transition region 2.

The configuration of the transition region 2 is also described below with reference to FIG. 2.

Figure 2:
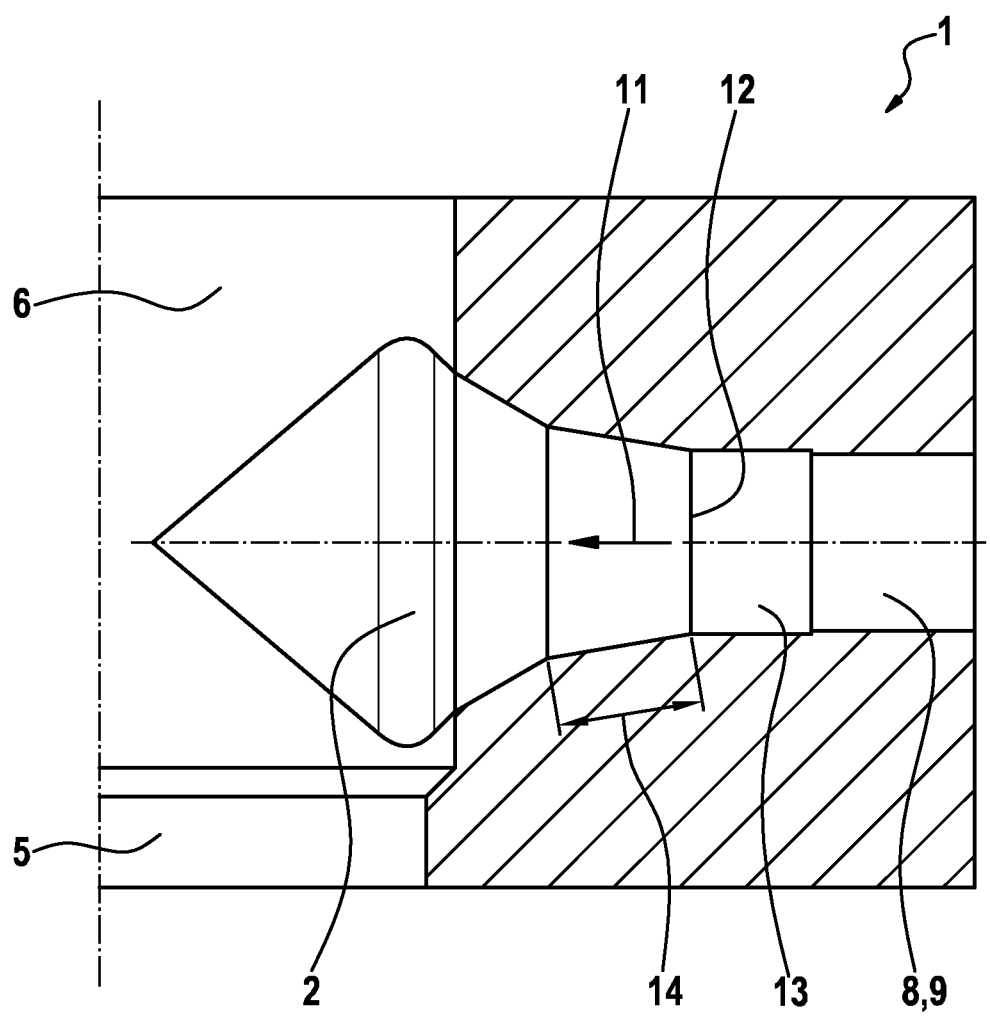
FIG. 2 shows the section of the metallic component, which is labeled in FIG. 1 with the symbol II, in a detailed depiction.

In a schematic depiction, FIG. 2 shows the section of the cylinder head 1 that denoted is denoted in FIG. 1 with the symbol II.

During the manufacture of the cylinder head 1, the workpiece having the bores 5, 8 is initially hardened. In so doing, a through-hardening of the entire workpiece preferably takes place. Said workpiece is preferably bainitically through-hardened in a salt bath. In the process, an oxidation layer forms on the surface of the through-hardened workpiece. Said oxidation layer especially forms at the bores 5, 6. The transition region 2 is subsequently re-worked. When reworking said transition region, at least one electrochemical removal and at least one mechanical removal are performed. At least two processing steps are thereby carried out during the re-working operation. It is however also possible for more than two steps to be carried out when reworking the transition region 2. A mechanical removal can particularly be performed both prior to and after the electrochemical removal.

The processing step of the mechanical removal comprises at least one honing process. Such a honing process can remove the oxidation layer either prior to the electrochemical removal in order not to allow a transition zone to develop or can take place subsequently to the electrochemical removal in order to again hone the transitional area smooth.

The electrochemical removal serves to round off the edges in the transition region 2. In this exemplary embodiment, the electrochemical removal is carried out in such a way that the transition region 2 increasingly enlarges in a direction 11 toward the bore 5. The re-worked transition region has thereby a trumpet shaped configuration.

After the electrochemical removal, the transition region 2 adjoins with the edge 12 thereof an at least substantially unprocessed section 13 of the bore 8. A transitional area 14 is formed at this edge 12. Because the implementation of the electrochemical removal especially by means of the shape of the tool specifies the desired configuration of the transition region 2 after said electrochemical removal, the edge 12 and therefore also the transitional area 14 are at least approximately determined from the outset.

If the mechanical removal, in particular the honing process, is carried out prior to the electrochemical removal, the oxidation layer of the stepped bore 8 is removed from the bore 5 up to the section 13. In so doing, the formation of a transition zone having a steep-coast shaped structure in the transitional area 14 is prevented. An unfavorable impact on the electrochemical removal is namely prevented by the removed oxidation layer.

If the mechanical removal is performed after the electrochemical removal, said mechanical removal then takes place especially in the transitional area 14 in order to reduce a roughness in said transitional area 14 which developed during the electrochemical removal.

If the mechanical removal is then performed in the transition region 2 prior to the electrochemical removal, the mechanical removal is then performed such that a surface layer formed by the hardening, in particular the surface oxidation layer of the surface of the bore 8, is removed at least in the transitional area 14.

If the mechanical removal on the other hand is performed after the electrochemical removal in the transition region 2, a roughness developed by the electrochemical removal is again reduced at least in the transitional area 14.

By doing this, a rounding of the transition region 2 can substantially take place by the electrochemical removal, whereas a processing of the transitional area 14 substantially occurs by means of the mechanical removal.

As a result of the honing process in the transitional area 14, a characteristic cross hatching can occur in the run-out area of the ECM processing operation. Such a cross hatching can especially be formed at least partially in the transitional area 14 and in the section 13.

Depending on configuration of the metallic component 1, even further transition regions can be re-worked in this manner. In an advantageous way, a transition region 2 between two bores 5, 8, which come in contact with each other, can be rounded. A transition region, which is configured between contours formed in a different way, can however also be rounded and re-worked.

The invention is not limited to the exemplary embodiments which have been described.

What is claimed is:

1. A method for manufacturing a metallic component (1) for high-pressure applications, where a hardening operation of the metallic component (1) has already taken place, the component comprising at least one intersection region (2), the method comprising reworking the intersection region (2) by both at least one electrochemical machining and at least one mechanical removal after the hardening operation has taken place, wherein in edge regions of a processing operation by the electrochemical machining a surface oxidation formed from the hardening operation is removed before the electrochemical machining takes place and/or a transitional area (14) is smoothed by the mechanical removal after the electrochemical machining takes place.

2. The method according to claim 1, characterized in that a mechanical removal is performed prior to the electrochemical machining in the intersection region (2) and in that the mechanical removal is performed such that a surface layer formed by the hardening is removed at least partially at least in certain regions.

3. The method according to claim 1, characterized in that a mechanical removal is performed after the electrochemical machining in the intersection region (2) and in that a roughness formed by the electrochemical machining is reduced at least in certain regions.

4. The method according to claim 1, characterized in that the intersection region (2) is rounded by the electrochemical machining, in that the transitional area (14) is provided on an edge of the intersection region (2), and in that the mechanical removal is performed at least substantially in the transitional area (14).

5. The method according to claim 1, characterized in that the mechanical machining is performed at least partially by means of honing.

6. The method according to claim 1, characterized in that the hardening is performed at least partially by a bainitic heat treatment.

7. The method according to claim 6, characterized in that the metallic component is formed from a material which is through-hardened by the hardening operation.

8. The method according to claim 1, characterized in that the metallic component is designed as a cylinder head for a high pressure pump or as a component for a fuel distributor rail or as a component for an injector.

9. The method according to claim 1, characterized in that the intersection region (2) forms part of a bore intersection.

10. The method according to claim 1, characterized in that an at least partially trumpet shaped intersection region (2) is formed by the electrochemical machining.

11. The method according to claim 1, wherein the component is for a fuel injection system of an air-compressing, self-igniting internal combustion engine.

12. The method according to claim 1, wherein the mechanical removal occurs both before and after the electrochemical machining.

13. The method according to claim 1, wherein the intersection region (2) includes an edge (12), and wherein the transitional area (14) is a portion of the intersection region (2) that is disposed along the edge (12).

14. The method according to claim 13, wherein the edge regions includes the edge (12).

15. The method according to claim 13, wherein the edge regions includes the transitional area (14).

16. The method according to claim 13, wherein the intersection region (2) extends between a first bore (5) and a second bore (8), and wherein the edge (12) defines a boundary between the second bore (8) and the transitional area (14).

17. The method according to claim 16, wherein the second bore (8) includes an unprocessed section (13) adjacent the edge (12).

* * * * *